(12) United States Patent
Gao et al.

(10) Patent No.: US 9,184,885 B2
(45) Date of Patent: Nov. 10, 2015

(54) DATA INTERACTION METHOD AND DATA INTERACTION DEVICE

(71) Applicant: China Academy of Telecommunications Technology, Beijing (CN)

(72) Inventors: Zhuo Gao, Beijing (CN); Xiangqian Zhu, Beijing (CN); Shaoli Kang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/360,650

(22) PCT Filed: Sep. 20, 2012

(86) PCT No.: PCT/CN2012/081689
§ 371 (c)(1),
(2) Date: May 27, 2014

(87) PCT Pub. No.: WO2013/082961
PCT Pub. Date: Jun. 13, 2013

(65) Prior Publication Data
US 2014/0325301 A1    Oct. 30, 2014

(30) Foreign Application Priority Data

Dec. 5, 2011    (CN) .......................... 2011 1 0400282

(51) Int. Cl.
*H04L 1/18*    (2006.01)
*H04L 5/00*    (2006.01)
(Continued)

(52) U.S. Cl.
CPC ............... *H04L 5/0005* (2013.01); *H04L 1/08* (2013.01); *H04L 1/1867* (2013.01); *H04W 72/042* (2013.01)

(58) Field of Classification Search
CPC ..... H04L 5/0005; H04L 1/08; H04W 72/042; H04W 72/121; H04W 72/04
See application file for complete search history.

(56) References Cited

U.S. PATENT DOCUMENTS 8,305,988 B2 *  11/2012  Seo et al. .................... 370/329
8,493,835 B2 *   7/2013  Gaal et al. ................... 370/208
(Continued)

FOREIGN PATENT DOCUMENTS

CN    102170641 A    8/2011
CN    102523606 A    6/2012
(Continued)

OTHER PUBLICATIONS

The Extended European Search Report issued Nov. 6, 2014 for the counterpart European Application 12855841.8.
International Search Report for PCT/CN2012/081689.

*Primary Examiner* — Esaw Abraham
(74) *Attorney, Agent, or Firm* — Kilpatrick Townsend & Stockton LLP

(57) ABSTRACT

Disclosed are a method and device for data exchanging, and relates to communication technology. The embodiments of the present application includes: pre-allocating virtual resource to user terminals, and activating the virtual resource in case of need, so user terminals can use the pre-allocated resource to exchange data with network side. When inactive, the virtual resource can allocated to other users. For small data, irregular service, pre-allocation of virtual resource and activating it in case of need, can improve efficiency of use of resource. Meanwhile, dividing users into groups and scheduling by groups can reduce control overhead.

10 Claims, 3 Drawing Sheets

(51) Int. Cl.
*H04L 1/08* (2006.01)
*H04W 72/04* (2009.01)

(56) References Cited

U.S. PATENT DOCUMENTS

| | | | |
|---|---|---|---|
| 8,532,050 B2* | 9/2013 | Awad | 370/330 |
| 8,792,435 B2* | 7/2014 | Xia et al. | 370/329 |
| 2002/0065080 A1 | 5/2002 | Pittampalli et al. | |

FOREIGN PATENT DOCUMENTS

| | | |
|---|---|---|
| EP | 0898434 A1 | 2/1999 |
| EP | 1780973 A1 | 5/2007 |
| EP | 2365678 A1 | 9/2011 |
| WO | 2007024321 A1 | 3/2007 |
| WO | 2010051209 A1 | 5/2010 |
| WO | 2011098993 | 8/2011 |

* cited by examiner

DATA INTERACTION METHOD AND DATA INTERACTION DEVICE

This application is a US National Stage of International Application No. PCT/CN2012/081689, filed Sep. 20, 2012, designating the United States, and claiming priority to Chinese Patent Application No. 201110400282.0, filed with the State Intellectual Property Office of People's Republic of China on Dec. 5, 2011, and entitled "Method and device for data interaction", the contents of which is hereby incorporated by reference in its entirety.

FIELD

The present invention relates to the field of communication technologies and particularly to a data interaction method and device.

BACKGROUND

In a cellular mobile communication network, frequency resources are required for a data transmission. However, the frequency resources are deficient and radio transmission environments are poor, thus how to allocate radio resources reasonably among multiple users and multiple services is a problem needing to be focused on in a system. Currently, there are several common resource allocation schemes as follows in the system.

Scheme 1) Fixed Resource Allocation

The concept of fixed resource allocation refers to allocating a certain number of radio resources to a user for exclusive use in a service until the end of the service. This scheme is commonly used in the $2^{nd}$ Generation Telecommunication (2G) and primary $3^{rd}$ Generation Telecommunication (3G) systems, where dedicated channels are mainly used, and mainly suitable for a circuit domain service. With regard to a packet domain service, since a packet is always arrived with burstiness and unpredictability, resource waste is easily to be caused with the fixed resource allocation scheme in a time period when no packet is arriving.

Scheme 2) Dynamic Scheduling

The basic concept of dynamic scheduling refers to determining which users are selected to be subjected to resource allocation at each scheduling time, according to information such as traffic volumes, priorities and channel conditions of various users. This scheme is commonly used in senior 3G and Long Term Evolution (LTE) systems and suitable for a burst packet service.

The essential process of dynamic scheduling is as follows.

A base station transmits resource scheduling signalling on a Physical Downlink Control Channel (PDCCH).

A UE detects the control channel and transmits data according to information in the resource scheduling signalling upon detecting that the resource scheduling signalling is for the UE.

FIG. 1 and FIG. 2 illustrate uplink and downlink dynamic scheduling processes by taking an LTE system for example.

As illustrated in FIG. 1, in the uplink scheduling process, firstly, the base station (e.g., eNode B (eNB)) transmits scheduling signalling on the PDCCH, wherein the scheduling signalling includes resource allocation information, transmission block format information and related Hybrid Automatic Repeat reQuest (HARQ) information and the like; secondly, the user equipment (UE) generates a corresponding uplink transmission block according to analysed scheduling signalling, and transmits the corresponding uplink transmission block to the eNB on the Uplink-Shared Channel (UL-SCH), wherein the timing relationship between the transmission on the PDCCH by the eNB and the transmission on the UL-SCH by the UE satisfies a scheduling timing sequence defined at a physical layer.

As illustrated in FIG. 2, in the downlink scheduling process, the eNB transmits PDCCH scheduling signalling and corresponding downlink service data in the same sub-frame, the UE obtains the resource allocation information, the transmission block format information, the associated HARQ information and the like by analysing the PDCCH, and receives and analyses corresponding transmission blocks on the Downlink-Shared Channel (DL-SCH).

The system allocates a Radio Network Temporary Identifier (RNTI) for each user, and the user determines whether it is being scheduled by determining whether the PDCCH carries the RNTI of the user. With respect to either uplink or downlink dynamic scheduling, because the system adopts the HARQ mechanism, a receiver after receiving and decoding a data packet will notify a transmitter of the decoded result through a feedback channel, so that the transmitter can retransmit a wrongly transmitted data packet in time, thus reducing a data transmission time delay.

Scheme 3) Semi-Persistent Scheduling

Semi-persistent scheduling is introduced based on the dynamic scheduling, and suitable for a service with a periodical data arrival and substantially constant data packet size, such as a Voice over IP (VoIP) service. The VoIP service includes an active state and a silent state, wherein voice packets arrive periodically at the active state and the period usually is 20 ms, and each voice packet is only several tens of bytes. If a dynamic scheduling mode is adopted for the VoIP service, the PDCCH needs to be independently transmitted for scheduling each voice packet, which will introduce great control overhead and reduce the number of users supported by the system.

In order to reduce the control overhead, and in consideration of the substantially constant voice packet size, a semi-persistent scheduling technology is introduced in the LTE system, and the principle thereof is as shown in FIG. 3, the resource allocation with semi-persistent scheduling is divided into two links, in one of which the eNB transmits Radio Resource Control (RRC) signalling for configuring a resource period and resources used for HARQ feedback, and in another one of which effective time of the semi-persistent resources and a frequency domain resource location are indicated by the PDCCH. The semi-persistent resource is periodically effective once being activated (in FIG. 3, the semi-persistent resource period is T), until it is released. With this scheme, excepting for activating semi-persistent resources, a PDCCH dynamic indication is not required for an initial transmission of a service packet (the indication is still needed in case of retransmission), thereby greatly reducing the control overhead.

As can be seen from the above, the dynamic scheduling is suitable for a packet service with strong burstiness and high data volume, so as to reduce the overhead proportion of control channels and increase the transmission efficiency; and the semi-persistent scheduling is suitable for a service with a regular data arrival and allocates periodical resources, so that a control channel indication is not required for an initial transmission of a data packet, thus reducing the control channel overhead.

Currently, the Internet of Things becomes the next hot trend of a communication system, the Internet of Things is organically combined with a cellular mobile communication network, and bearing for a part of services of the Internet of Things by virtue of a cellular radio network is an important technical branch.

Take a smart power grid for example, a large number of services therein such as electricity meter reading, electric power load monitoring, electric energy monitoring and the like can be born by a cellular radio network, and data analysis and control can be performed by background processing modules. These services are mainly characterized by low data volume, multi-terminal concurrency, and acquiring data as needed by a control system periodically or on demand.

Obviously, due to the low data volume, the control overhead with the dynamic scheduling will be much too high: and due to an unfixed period, allocating periodical resources with the semi-persistent scheduling will result in resource waste. Thus, the resource allocation schemes used currently will lead to excessive control overhead or resource waste in case of bearing a data interaction service with a low data volume and an unfixed period.

SUMMARY

Embodiments of the invention provide a data interaction method and device so as to increase the utilization efficiency of resources and reduce control overhead in case of bearing a service with a low data volume and an unfixed period.

A data interaction method including:

determining that data interaction needs to be performed with user equipments in a user equipment group; and activating virtual resources pre-allocated to the user equipment group, and performing data interaction with the user equipments in the user equipment group over the activated virtual resources.

A data interaction method including:

receiving activation information carrying an identifier of a user equipment group transmitted from a network side after the network side determines that data interaction needs to be performed with user equipments in the user equipment group; and performing data interaction with the network side over activated virtual resources.

A data interaction device including:

a determination component configured for determining that data interaction needs to be performed with user equipments in a user equipment group; and an activation component configured for activating virtual resources pre-allocated to the user equipment group, and for performing data interaction with the user equipments in the user equipment group over the activated virtual resources.

A data interaction device including:

a reception component configured for receiving activation information carrying an identifier of a user equipment group transmitted from a network side after the network side determines that data interaction needs to be performed with user equipments in the user equipment group; and a data interaction component configured for performing data interaction with the network side over activated virtual resources.

The embodiments of the invention provide a data interaction method and device, wherein virtual resources are pre-allocated to user equipments, and the virtual resources are activated as needed, so that the user equipments can realize data interaction with the network side by using the pre-allocated resources. The virtual resources can be allocated to other users for use in case of not being activated, therefore, for a service with a low data volume and an unfixed period, the utilization efficiency of resources can be increased by allocating the virtual resources to the user equipments and activating the virtual resources as needed. Meanwhile, control overhead can be reduced by grouping the user equipments and scheduling by taking a group as a unit.

DETAILED DESCRIPTION

Embodiments of the present invention provide a data interaction method and device, wherein virtual resources are pre-allocated to user equipments, and the virtual resources are activated as needed, so that the user equipments can realize data interaction with a network side by using the pre-allocated resources. The virtual resources can be allocated to other users for use in case of not being activated, therefore, for a service with a low data volume and an unfixed period, the utilization efficiency of resources can be increased by allocating the virtual resources to the user equipments and activating the virtual resources as needed. Meanwhile, control overhead can be reduced by grouping the user equipments and scheduling by taking a group as a unit.

Figure 1:
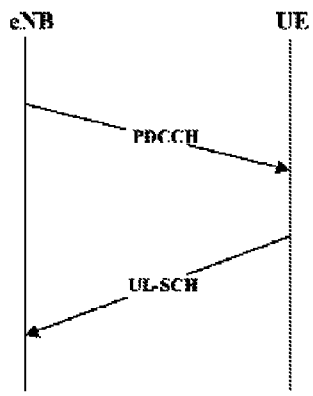
FIG. 1 is a schematic diagram of an uplink dynamic scheduling process in the prior art.
Figure 2:
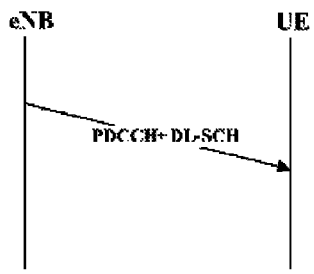
FIG. 2 is a schematic diagram of a downlink dynamic scheduling process in the prior art.
Figure 3:
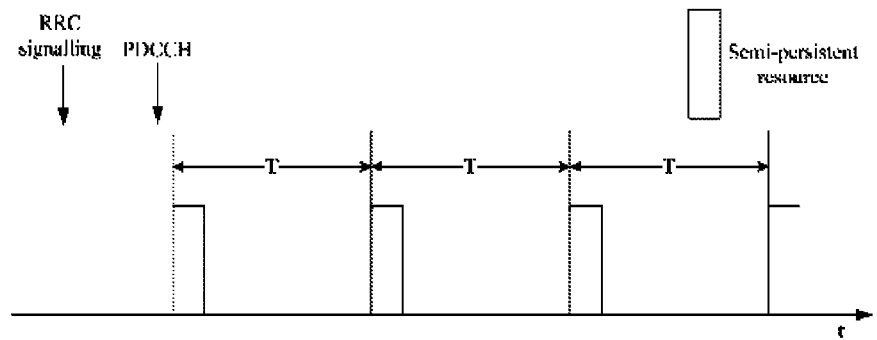
FIG. 3 is a schematic diagram of semi-persistent scheduling resource allocation in the prior art.
Figure 4:
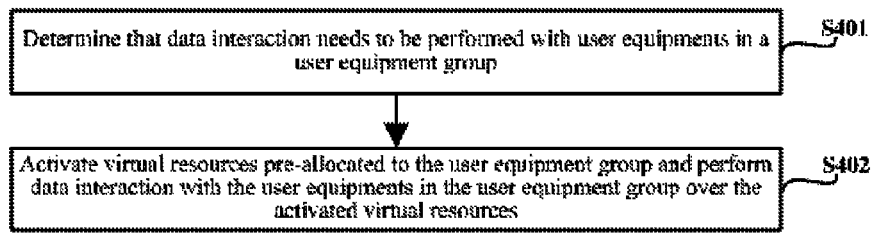
FIG. 4 is a flow chart of a data interaction method according to an embodiment of the invention.

As illustrated in FIG. 4, a data interaction method according to an embodiment of the invention includes:

step S401, determining that data interaction needs to be performed with user equipments in a user equipment group; and step S402, activating virtual resources pre-allocated to the user equipment group, and performing data interaction with the user equipments in the user equipment group over the activated virtual resources.

Wherein the virtual resources are resources pre-allocated to the user equipments, the resources can only be used by the user equipments after being activated, and can still be allocated to other users for use before being activated.

Since each user in the user equipment group has been pre-allocated with virtual resources, during scheduling, instant resource allocation is not needed, and only the virtual resources allocated to the user equipment group need to be activated, and moreover, the virtual resources of one user equipment group can be activated at one time and scheduling does not need to be performed on each user, thus reducing the control overhead.

Meanwhile, because the virtual resources are activated only when the data interaction needs to be performed, the virtual resources can also be allocated to other users for use before being activated, and then the utilization rate of the resources is increased.

In an initial state, grouping needs to be performed on user equipments, virtual resource allocation should be done for user equipments in each user equipment group, and each user equipment is notified of a group identifier and the location of virtual resources corresponding to the user equipment.

In this way, a user equipment, when receiving activation information carrying a group identifier of the user equipment, determines that virtual resources allocated to the user equipment are activated for receiving and transmitting data.

Specifically, user equipments may be grouped and allocated with virtual resources in any one of the following modes.

Mode 1, grouping is performed according to the service type of user equipments, i.e., user equipments with the same service type are grouped into the same group. In this mode, grouping is performed according to services applied by users, i.e., users applying the same type of service are grouped into the same group and allocated with one group identifier for addressing the group of users. If a user has multiple services, the user can be grouped into multiple service groups, and the type of a service with data interaction can be determined according to the group identifier carried by the control channel.

Mode 2, grouping is performed according to available virtual resources, i.e. the number of available resource blocks in each time domain period is determined according to available virtual resources, the number of user equipments in each user equipment group is determined according to the number of available resource blocks in each time domain period and the number of resource blocks needed by respective user equipments, and then grouping is performed. In this mode, grouping is performed according to available virtual resources. that is, virtual resources needed by each user equipment are determined according to the service type of the user equipment and channel conditions at first, and then virtual resources are allocated sequentially per time domain period, and when available virtual resources in a time domain period (the length is a transmission time interval which is 1 ms in the LTE system) has been allocated, a user equipment group is obtained, and virtual resource allocation for user equipments in the next group is performed. The network side allocates a group identifier for each group, wherein the group identifier is used for addressing user equipments in the group.

For example, 10 frequency domain resource blocks are allocated for user equipments in each time domain period, and each user equipment needs 2 frequency domain resource blocks, then each group includes 5 user equipments at most, if 20 user equipments need to be grouped, then 4 groups need to be configured to meet transmission needs of these user equipments. During specific implementation, different users in one group may need different number of frequency domain resource blocks, for example, service 1 of user equipment A needs 2 frequency domain resources, service 2 of user equipment A needs 3 frequency domain resources, user equipment B needs 3 frequency domain resources, and user equipment C needs 2 frequency domain resources, then one group may only include the three user equipments A, B and C.

Mode 3, firstly, grouping is performed according to the service type of user equipments, i.e., user equipments with the same service type are grouped into the same group; secondly, when virtual resources in one time domain period are not enough to be allocated to user equipments in one same group, the number of user equipments in a user equipment group is determined according to the number of available resource blocks in the time domain period and the number of resource blocks needed by each user equipment in the same group, and the user equipments in the same group, to which the virtual resources in the time domain period are not enough to be allocated, are divided into multiple groups.

In another word, firstly, grouping is performed according to the service type of user equipments as in mode 1, secondly, if too many users apply the same service and thus leading to that virtual resources (frequency domain or code domain) in one time domain period are not enough to be allocated to the users, the users are further grouped in mode 2.

For example, the grouping result with mode 3 may be as in Table 1:

TABLE 1

Grouping Result with Mode 3

| Service type | Group identifier | User |
| --- | --- | --- |
| 1 | 1 | user 1, user 2, user 3, user 4, user 5 |
| 1 | 2 | user 6, user 7, user 8, user 9 |
| 2 | 3 | user 1, user 3, user 5, user 6, user 8 |
| 3 | 4 | user 2, user 4, user 10, user 11, user 12 |
| 3 | 5 | user 7, user 13, user 14, user 15, user 16 |

As can be seen from Table 1 that, the service type 1 includes user 1, user 2, user 3, user 4, user 5, user 6, user 7, user 8 and user 9, the service type 2 includes user 1, user 3, user 5, user 6 and user 8, and the service type 3 includes user 2, user 4, user 10, user 11, user 12, user 7, user 13, user 14, user 15 and user 16. There are too many users in the service type 1 and the service type 3, and each type is divided into two groups, that is, the service type 1 includes a group 1 and a group 2, and the service type 3 includes a group 4 and a group 5.

After users are grouped in mode 3, the current type of data interaction service of a user can be determined according to a group identifier, thus facilitating uniform scheduling based on service types by the network side.

As the number of resources needed by a user equipment is related to the service type and the channel conditions, and the number of resources needed by each user equipment directly influences the number of user equipments which can be accommodated in one group, the process of virtual resource allocation is usually overlapped with the process of user group division, that is, during the group division process, allocation for numbers and locations of virtual resources of the user equipments is also accomplished.

During group identifier allocation, the group identifiers can be individually designed, or a part of identifiers for scheduling a single user can be reserved and specially used as the group identifiers, for example, identifiers No. 0-20 are specially used as the group identifiers, and other identifiers are used as user identifiers.

After grouping the user equipments and allocating the virtual resources, the network side needs to notify each user equipment of the group identifier of the user equipment and the corresponding virtual resource location of the user equipment, and during specific implementation, the user equipments can be notified of the corresponding group identifier, virtual resource index and transmission information for each service.

The network side can notify the user equipment of the group identifier and the allocated virtual resource location through high-level signalling, and in addition, can notify the user equipment of necessary transmission information such as the sizes of data blocks to be transmitted or received, the adopted encoding modulation mode and the like, and the high-level signalling is in a format as shown in Table 2.

TABLE 2

| High-Level Signalling Format Table | | | |
|---|---|---|---|
| Service type | Group identifier | Virtual resource index | Transmission information |

Besides the key information listed in Table 2, when feedback needs to be performed, the network side can also explicitly notify each user equipment of the available feedback channels, alternatively, the network side may not notify the available feedback channels, and the available feedback channels are determined by the user equipment according to an association relationship between predefined virtual resources and the feedback channels.

In step S401, the network side determines that data interaction needs to be performed with user equipments in a user equipment group in any of the following three scenarios, i.e., when it is determined that a preset period of acquiring or issuing data is arrived, when it is determined that abnormal conditions are monitored so that the user equipments in the user equipment group have to report data, or when it is determined that abnormal conditions are monitored so that control instructions have to be transmitted to the user equipments in the user equipment group.

The network side may activate the virtual resources when data transmission and reception are required. Taking electric power load acquisition in a smart power grid for example, the electric power load acquisition can be performed periodically, that is, the uplink virtual resources are activated periodically so that each user equipment can report the acquired load information to the network; further, the uplink virtual resources can also be activated when abnormities are monitored by virtue of other conditions, so that the user equipments can report the acquired load information.

A user equipment usually detects a control channel in real time or according to a preconfigured period, once the user equipment detects that virtual resources allocated to itself are activated, data transmission and reception are completed on the activated virtual resources, that is, data reception is performed once downlink virtual resources are activated, and data transmission is performed once uplink virtual resources are activated.

Usually, the user equipment determines that the virtual resources allocated to itself are activated while detecting activation information carrying its own group identifier or its own identifier.

Virtual resources do not take effect before being activated, and the corresponding resources can be allocated to other users according to system requirements, for example, the corresponding resources can be allocated to users initiating traditional telecom services.

The activation information is transmitted on a control channel. Taking an LTE system for example, the activation information may be born on the PDCCH. The PDCCH in the LTE system is mainly designed for scheduling a single user, and carries contents such as the scheduling identifier of the user, the frequency domain resources used by the user, the sizes of transmission blocks and HARQ information. In an embodiment of the present invention, information such as resources used by a user, sizes of the transmission blocks, an adopted modulation encoding mode are already configured to the user by high-level signalling, the control channel used in the embodiment of the invention can be greatly simplified, and can merely carry the group identifier or user identifier to activate the virtual resources.

In order to further save resources, time for data preparation can be reserved for the user equipments, and the effect-taking time of the virtual resources can be set, in this way, in step S402, activating virtual resources pre-allocated to the user equipment group may be implemented in any of the following schemes.

Scheme 1, activation information carrying the identifier of the user equipment is transmitted on the control channel, and the virtual resources of the user equipment group are immediately activated; in this scheme, the virtual resources of the user equipment group are activated immediately by the activation information transmitted by the network side. In a downlink direction in which the user equipments receive data, the user equipments do not need to perform the preparation work such as data reading, thus the scheme 1 may be adopted.

Scheme 2, the activation information carrying the group identifier of the user equipments is transmitted on the control channels, and the virtual resources of the user equipment group are activated after waiting for a preset time interval; for example, in an uplink direction, because a certain time is needed for the user equipments to perform control channel analysis and uplink data packet assembly, the virtual resources in the uplink direction can take effect in the $N^{th}$ transmission time interval after the activation information is received. Setting for N needs to consider a time delay for the user equipments performing control channel analysis and uplink data packet assembly, further, for some services, such as electricity meter reading data report, if the user equipments read meters after receiving the activation information, then setting for N also needs to consider a time delay for acquiring data by the user equipments.

Scheme 3, the activation information carrying the group identifier of the user equipments and an effect-taking time interval is transmitted on the control channel, and the virtual resources of the user equipment group are activated after waiting for the effect-taking time interval; in this scheme, the effect-taking time of the resources needs to be indicated in high-level signalling or on the control channel. For example, a field of 'time offset' can be added in the activation information when the effect-taking time is explicitly indicated on the control channel, so as to notify the user equipments of the offset of virtual resource effect-taking time relative to activation information transmission time. With this scheme, a certain control overhead is added, but the implementation is flexible, in particular, for uplink data acquisition services, the virtual resource effect-taking time can be flexibly configured according to the time needed by acquiring different types of data.

Scheme 4, activation information carrying the group identifier of the user equipments, an effect-taking time interval and number of effect-taking times is transmitted on the control channel, and every time when the number of activation times is less than the number of effect-taking times, the virtual resources of the user equipment group are activated after waiting for the effect-taking time interval; that is, the number of times that the virtual resources take effect after each time the virtual resources is activated is predefined in standards or explicitly indicated through high-level signalling or the control channel, if the number of effect-taking times is greater than 1, the time interval of the adjacent two taking-effect resources needs to be given.

For example, for services such as electricity meter reading, the number of effect-taking times can be directly set to be large, and the time interval is set, so that the user equipments transmit the electricity meter reading result through the activated virtual resources after each time interval.

In an actual system, due to the unstable radio propagation environment, a part of user equipments may be unable to correctly analyse the activation information transmitted by the network side, thereby causing the user equipments to be unable to complete data transmission and reception on activated virtual resources. The network side can judge whether the virtual resources are correctly activated or not by detecting signal intensity, for example, in the uplink direction, the network activates the virtual resources for a certain user equipment, and the user equipment does not correctly analyse the control channel and does not transmit any information on the resources, then the network side determines that the signal intensity is too low while receiving data on the resources so as to judge that the user does not transmit information.

When it is determined that there is a user equipment in the user equipment group which does not actually active the virtual resources, the virtual resources pre-allocated to the user equipment group may be reactivated, or control signalling is transmitted to the user equipment which does not active the virtual resources independently so as to activate the virtual resources of the user equipment.

Reactivation of the virtual resources pre-allocated to the user equipment group is concentrated activation. After activation information is transmitted, as long as the network side detects that there is a user equipment in the group which does not be actually activate the virtual resources, then the activation information carrying the group identifier is retransmitted. This mode is simple to implement, but may cause resource waste, because the virtual resources are reactivated for users which have already successfully activated the virtual resources.

Transmitting control signalling independently to the user equipment which does not active the virtual resources so as to activate the virtual resources of the user equipment, is dispersed activation. After activation information is transmitted, the network side transmits the activation information independently for each detected user which does not active the virtual resources, and performs resource allocation so that the user can complete the data transmission and reception. This mode is flexible and free from resource waste, but when many users which do not active the virtual resources exist, control signalling expense is increased. The activation information transmitted independently may only carry the identifier of the user equipment, rather than carrying the group identifier of the user equipments.

In general, the concentrated activation is suitable for the case that many users which do not active the virtual resources exist, the dispersed activation is suitable for the case that few users which do not active the virtual resources exist, the actual system may flexibly select according to the number of the users which do not active the virtual resources, when the number of the users which do not active the virtual resources exceeds a set value, then the concentrated activation is used, or else, the dispersed activation is used.

In order to reduce the data transmission time delay and increase the transmission efficiency, the HARQ technology is introduced in a lot of cellular mobile communication systems, a receiver performs rapid feedback on the wrong data packets and performs combined decoding on the data retransmitted by a transmitter and the data received previously, so as to increase the decoding success rate.

When a feedback of a user equipment on a wrong data packet is received, the user equipment group where the user equipment is located can be reactivated, and the data packet is retransmitted to the user equipment group where the user equipment is located; or activation information carrying the group identifier of the user equipment group and a retransmission identifier is transmitted on the control channel, after the user equipment needing to re-receive the data packet activates the virtual resources, the data packet is retransmitted to the user equipment over the activated virtual resources; or the user equipment needing to re-receive the data packet can be scheduled independently, and the data packet is retransmitted to the user equipment.

When a data packet transmitted by a user equipment is determined to be wrong, the user equipment group where the user equipment is located can be reactivated, and the data packet retransmitted by each user equipment in the user equipment group is received; or the user equipment needing to retransmit the data packet can be scheduled independently, and the data packet retransmitted by the user equipment is received.

The retransmission mechanism according to an embodiment of the invention is specifically illustrated below by taking downlink transmission for example. During practical applications, a part of users in the same group may correctly receive the data packets and other users do not correctly receive, thus several schemes for processing retransmission are provided below.

Scheme 1: all retransmission. That is, as long as a user does not correctly receive a data packet, data packets of all users in the group are retransmitted. This scheme is simple to implement, but will waste system resources.

Scheme 2: partial retransmission and centralized scheduling. That is, retransmission is only performed for a wrongly transmitted data packet, and the user is notified of receiving the retransmitted data packet by activation information. In order to avoid resource waste, in the scheme 2, a 1-bit indication field, i.e., a retransmission identifier, needs to be added in the virtual resource control channel, and used for distinguishing whether the virtual resource activation of this time is for new data transmission or retransmission. If retransmission is indicated, then the corresponding virtual resources of the users which have already correctly received the data packet do not be activated, and the un-activated resources can be used by other users than users in the group or other services.

The redundancy version information of the HARQ needed by retransmitted data combination may be predefined by a standard, or be explicitly notified on the control channel. If the acquisition service data volume is high so that many times of transmission is needed in a short time, then the process number of the HARQ needs to be carried in the control channel, thus avoiding the confusion of retransmitted data combination.

Scheme 3: partial retransmission, and dispersed scheduling. That is, retransmission is only performed for a wrongly transmitted data packet, and scheduling signalling independently transmitted to each user needing to retransmit the data packet is adopted instead of virtual resource activation. This scheme is flexible, and the data retransmission of each user can be flexibly set according to the conditions of system resources instead of completing the data retransmission of the users at the same time. The disadvantage is that when many users needing retransmission exist, many control channels are needed, thus increasing the control overhead of the system, therefore, this scheme is suitable for scenes with few data retransmission cases.

During practical applications, a network scheduler may flexibly select scheme 2 or scheme 3 according to the number of users needing to perform data retransmission.

Figure 5:
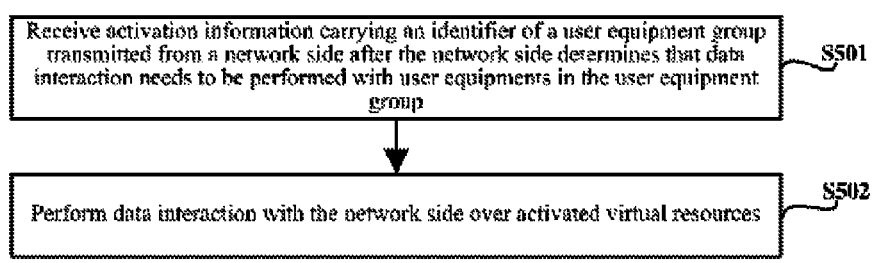
FIG. 5 is a flow chart of a data interaction method at a user equipment side according to an embodiment of the invention.

An embodiment of the present invention further provides a data interaction method at the user equipment side, as shown in FIG. 5, including:

step S501, receiving activation information carrying an identifier of a user equipment group transmitted from a network side after the network side determines that data interaction needs to be performed with user equipments in the user equipment group; and step S502, performing data interaction with the network side over activated virtual resources.

In an initial case, after user equipment division and virtual resource allocation, that is, after the network side divides user equipments into groups and allocates virtual resources to each user equipment in each group, a user equipment also needs to receive a message from the network side for notifying the user equipment of the group identifier and the corresponding virtual resource location of the user equipment.

When a feedback channel is not appointed, the user equipment also needs to receive an available feedback channel notified by the network side, and transmits a feedback message on the feedback channel.

When a corresponding relationship between the virtual resources and the feedback channel is preset, the feedback message can be transmitted on the feedback channel corresponding to the virtual resources of the user equipment according to the preset corresponding relationship between the virtual resources and the feedback channel.

According to different effect-taking time settings, in step S502, data interaction with the network side over activated virtual resources are performed by:

waiting for a preset time interval after receiving the activation information carrying the identifier of the user equipment group, and then performing data interaction with the network side over the activated virtual resources; or waiting for an effect-taking time interval after receiving the activation information carrying the identifier of the user equipment group and the effect-taking time interval, and then performing data interaction with the network side over the activated virtual resources; or waiting for an effect-taking time interval every time when the number of activation times is less than the number of effect-taking times after receiving the activation information carrying the identifier of the user equipment group, the effect-taking time interval and the number of effect-taking times, and then performing data interaction with the network side over the activated virtual resources.

When reception for a data packet goes wrong, activation information carrying the identifier of the user equipment group and a retransmission identifier is received, and if reception for a previous data packet is determined to go wrong, then the virtual resources are selected to be activated, and the data packet retransmitted by the network side over the activated virtual resources are received.

Figure 6:
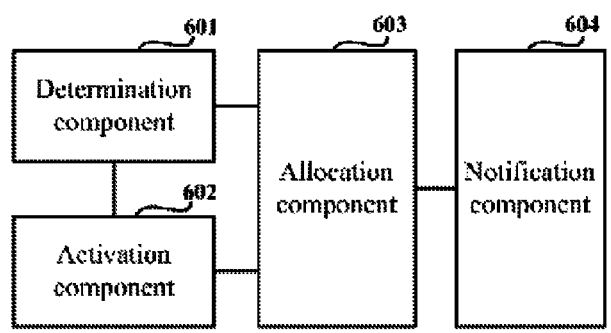
FIG. 6 is a structural schematic diagram of a data interaction device according to an embodiment of the invention.

An embodiment of the present invention further provides a data interaction device, as shown in FIG. 6, including:

a determination component 601 configured for determining that data interaction needs to be performed with user equipments in a user equipment group; and an activation component 602 configured for activating virtual resources pre-allocated to the user equipment group, and for performing data interaction with the user equipments in the user equipment group over the activated virtual resources.

In the initial state, it is needed for grouping user equipments, allocating virtual resources to the user equipments and notifying the user equipments of the grouping result and the virtual resources, as illustrated in FIG. 6, the device further includes:

an allocation component 603 configured for grouping user equipments, and allocating virtual resources for user equipments in each user equipment group; and a notification component 604 configured for notifying each user equipment of a group identifier of the user equipment and a location of virtual resources corresponding to the user equipment.

According to different grouping modes, the allocation component 603 is configured for grouping the user equipments by:

grouping, according to service types of the user equipments, user equipments with the same type of service into the same group; or determining the number of available resource blocks in each time domain period according to available virtual resources, determining the number of user equipments in each user equipment group according to the number of available resource blocks in each time domain period and the number of resource blocks needed by respective user equipments, and then grouping the user equipments; or grouping, according to service types of the user equipments, user equipments with the same type of service into the same group, and when virtual resources in a time domain period are not enough to be allocated to the user equipments in the same group, determining the number of user equipments in the user equipment group according to the number of available resource blocks in the time domain period and the number of resource blocks needed by each user equipment in the same group, and dividing the user equipments in the same group to which the virtual resources in the time domain period are not enough to be allocated, into multiple groups.

The notification component 604 is configured for:

with respect to each service, notifying a corresponding group identifier, virtual resource indexes and transmission information of the user equipment.

When a feedback channel is not appointed, the notification component 604 is further configured for:

notifying the user equipment of an available feedback channel.

The determination component 601 is configured for:

determining that a preset period of acquiring or issuing data is arrived; or determining that an abnormal condition is monitored so that the user equipments in the user equipment group needs to report data; or determining that an abnormal condition is monitored so that a control instruction needs to be transmitted to the user equipments in the user equipment group.

According to different effect-taking time, the activation component 602 is configured for activating the virtual resources pre-allocated to the user equipment by:

transmitting activation information carrying an identifier of the user equipment group on a control channel, and immediately activating the virtual resources of the user equipment group; or transmitting the activation information carrying an identifier of the user equipment group on a control channel, and activating the virtual resources of the user equipment group after waiting for a preset time interval; or transmitting activation information carrying an identifier of the user equipment group and an effect-taking time interval on a control channel, and activating the virtual resources of the user equipment group after waiting for the effect-taking time interval; or transmitting activation information carrying an identifier of the user equipment group, an effect-taking time interval and the number of effect-taking times on a control channel, and activating the virtual resources of the user equipment group after waiting for the effect-taking time interval every time when the number of activation times is less than the number of effect-taking times.

In order to ensure that virtual resources which have not been actually activated can be reactivated, the activation component 602 is further configured for:

detecting that there is a user equipment in the user equipment group which does not actually activate the virtual resources after activating the virtual resources pre-allocated to the user equipment group; and reactivating the virtual resources pre-allocated to the user equipment group, or independently transmitting control signalling to the user equipment which does not actually activate the virtual resources so as to activate the virtual resources of the user equipment.

When data transmission goes wrong, the activation component 602 is further configured for:

when a feedback from a user equipment on a wrong data packet is received, reactivating the user equipment group where the user equipment is located, and retransmitting the data packet to the user equipment group where the user equipment is located; or transmitting activation information carrying the identifier of the user equipment group and a retransmission identifier on the control channel, and after the user equipment needing to re-receive the data packet selects to activate the virtual resources, retransmitting the data packet to the user equipment over the activated virtual resources; or independently scheduling the user equipment needing to re-receive the data packet, and retransmitting the data packet to the user equipment;

when a data packet transmitted by a user equipment is determined to be wrong, reactivating the user equipment group where the user equipment is located, and receiving the data packet retransmitted by each user equipment in the user equipment group; or independently scheduling the user equipment needing to retransmit the data packet, and receiving the data packet transmitted by the user equipments.

Figure 7:
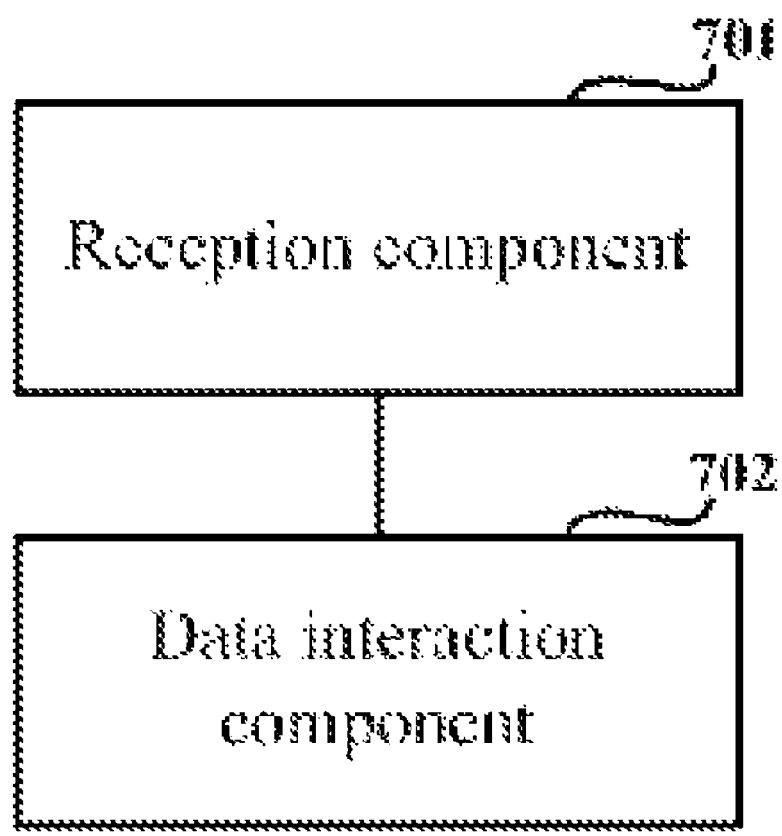
FIG. 7 is another structural schematic diagram of a data interaction device according to an embodiment of the invention.

An embodiment of the invention further provides a data interaction device, wherein the device may be embodied as a user equipment, as shown in FIG. 7, the device includes:

a reception component 701 configured for receiving activation information carrying an identifier of a user equipment group transmitted from a network side after the network side determines that data interaction needs to be performed with user equipments in the user equipment group; and a data interaction component 702 configured for performing data interaction with the network side over activated virtual resources.

The reception component 701 is further configured:

after the network side groups user equipments into groups and allocates virtual resources to each user equipment in each group, for receiving a message from the network side for notifying a user equipment of a group identifier of the user equipment and a location of virtual resources corresponding to the user equipment.

When a feedback needs to be performed, the device further includes:

a feedback component configured for receiving an available feedback channel notified by the network side and transmitting a feedback message on the feedback channel, or for transmitting a feedback message on a feedback channel corresponding to virtual resources of a user equipment according to a preset corresponding relationship between the virtual resources and the feedback channel.

According to different effective schemes, the data interaction component 702 is configured for:

waiting for a preset time interval after receiving activation information carrying an identifier of a user equipment group, and then performing data interaction with the network side over the activated virtual resources; or waiting for an effect-taking time interval after receiving activation information carrying an identifier of a user equipment group and the effect-taking time interval, and then performing data interaction with the network side over the activated virtual resources; or waiting for an effect-taking time interval every time when the number of activation times is less than the number of effect-taking times after receiving activation information carrying an identifier of a user equipment group, the effect-taking time interval and the number of effect-taking times, and then performing data interaction with the network side over the activated virtual resources.

In order to ensure correct reception of a data packet and further save resources during retransmission, the device further includes:

a retransmission component configured, when determining a data packet received previously is wrong after receiving activation information carrying the identifier of the user equipment group and a retransmission identifier, for activating the virtual resources and receiving the data packet retransmitted by the network side over the activated virtual resources.

Embodiments of the invention provide a data interaction method and device, wherein virtual resources are pre-allocated to user equipments, and the virtual resources are activated as needed, so that the user equipments can realize data interaction with a network side by using the pre-allocated resources. The virtual resource can be allocated to other users for use in case of being not activated, therefore, for services with a low data volume and an unfixed period, the utilization efficiency of the resources can be increased by allocating the virtual resources to the user equipments and activating the virtual resources as needed. Meanwhile, control overhead can be reduced by grouping the user equipments and scheduling by taking a group as a unit.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

The invention claimed is:

1. A data interaction method comprising:
grouping user equipments and allocating virtual resources for user equipments in each user equipment group, wherein the virtual resources are resources pre-allocated to the user equipments and capable of being used by user equipments only after being activated; and
notifying each user equipment of a group identifier and a virtual resource location corresponding to the user equipment;
determining that data interaction needs to be performed with user equipments in a user equipment group; and
activating virtual resources pre-allocated to the user equipment group by transmitting activation information, and performing data interaction with the user equipments in the user equipment group over the activated virtual resources.

2. The method of claim 1, wherein the grouping the user equipments comprises:
grouping, according to service types of the user equipments, user equipments with the same type of service into the same group; or
determining the number of available resource blocks in each time domain period according to available virtual resources, determining the number of user equipments in each user equipment group according to the number of available resource blocks in each time domain period and the number of resource blocks needed by each user equipment, and grouping the user equipments according to the number of user equipments in each user equipment group; or
grouping, according to service types of the user equipments, user equipments with the same type of service into the same group, and when virtual resources in a time domain period are not enough to be allocated to the user equipments in the same group, determining the number of user equipments in the user equipment group according to the number of available resource blocks in the time domain period and the number of resource blocks needed by each user equipment in the group, and dividing the user equipments in the group to which the virtual resources in the time domain period are not enough to be allocated, into multiple groups.

3. The method of claim 1, wherein the notifying each user equipment of a group identifier and a virtual resource location corresponding to the user equipment comprises:
notifying each user equipment of a group identifier, a virtual resource index and transmission information corresponding to the user equipment for each service.

4. The method of claim 1, wherein determining that data interaction needs to be performed with user equipments in a user equipment group by:
determining that a preset period of acquiring or issuing data is arrived; or
determining that an abnormal condition is monitored so that the user equipments in the user equipment group have to report data; or
determining that an abnormal condition is monitored so that a control instruction has to be transmitted to the user equipments in the user equipment group.

5. The method of claim 1, wherein the activating virtual resources pre-allocated to the user equipment group comprises:
transmitting activation information carrying an identifier of the user equipment group on a control channel, and immediately activating the virtual resources of the user equipment group; or
transmitting activation information carrying an identifier of the user equipment group on a control channel, and activating the virtual resources of the user equipment group after waiting for a preset time interval; or
transmitting activation information carrying an identifier of the user equipment group and an effect-taking time interval on a control channel, and activating the virtual resources of the user equipment group after waiting for the effect-taking time interval; or
transmitting activation information carrying an identifier of the user equipment group, an effect-taking time interval and the number of effect-taking times on a control channel, and activating the virtual resources of the user equipment group after waiting for the effect-taking time interval every time when the number of activation times is less than the number of effect-taking times.

6. The method of claim 1, wherein after activating the virtual resources pre-allocated to the user equipment group, the method further comprises:
detecting that there is a user equipment in the user equipment group which does not actually activate the virtual resources; and
reactivating the virtual resources pre-allocated to the user equipment group, or independently transmitting control signaling to the user equipment which does not actually activate the virtual resources so as to activate the virtual resources of the user equipment.

7. The method of claim 1, wherein when a feedback from a user equipment on a wrong data packet is received, the method further comprises:
- reactivating a user equipment group where the user equipment is located, and retransmitting the data packet to the user equipment group where the user equipment is located; or
- transmitting activation information carrying a group identifier of the user equipment and a retransmission identifier on a control channel, and retransmitting the data packet to the user equipment needing to re-receive the data packet over activated virtual resources after the user equipment activates the virtual resources; or
- independently scheduling the user equipment needing to re-receive the data packet, and retransmitting the data packet to the user equipment; and
- when a data packet transmitted by a user equipment is determined to be wrong, the method further comprises:
- reactivating a user equipment group where the user equipment is located, and receiving the data packet retransmitted by each user equipment in the user equipment group; or
- independently scheduling the user equipment needing to retransmit the data packet, and receiving the data packet transmitted by the user equipment.

8. A data interaction device, comprising at least one processor and storage medium with computer program instructions stored thereon, wherein the computer program instructions are executed by the at least one processor to implement:
- grouping user equipments and allocating virtual resources for user equipments in each user equipment group, wherein the virtual resources are resources pre-allocated to the user equipments and capable of being used by user equipments only after being activated;
- notifying each user equipment of a group identifier and a virtual resource location corresponding to the user equipment;
- determining that data interaction needs to be performed with user equipments in a user equipment group; and
- activating virtual resources pre-allocated to the user equipment group by transmitting activation information, and performing data interaction with the user equipments in the user equipment group over the activated virtual resources.

9. The device of claim 8, wherein the computer program instructions are executed by the at least one processor to implement:
- determining that a preset period of acquiring or issuing data is arrived; or
- determining that an abnormal condition is monitored so that the user equipments in the user equipment group have to report data; or
- determining that an abnormal condition is monitored so that a control instruction has to be transmitted to the user equipments in the user equipment group.

10. The device of claim 8, wherein the computer program instructions are executed by the at least one processor, to activate the virtual resources pre-allocated to the user equipment group by:
- transmitting activation information carrying an identifier of the user equipment group on a control channel, and immediately activating the virtual resources of the user equipment group; or
- transmitting activation information carrying an identifier of the user equipment group on a control channel, and activating the virtual resources of the user equipment group after waiting for a preset time interval; or
- transmitting activation information carrying an identifier of the user equipment group and an effect-taking time interval on a control channel, and activating the virtual resources of the user equipment group after waiting for the effect-taking time interval; or
- transmitting activation information carrying an identifier of the user equipment group, an effect-taking time interval and the number of effect-taking times on a control channel, and activating the virtual resources of the user equipment group after waiting for the effect-taking time interval every time when the number of activation times is less than the number of effect-taking times.

* * * * *